(12) United States Patent
Rogers et al.

(10) Patent No.: US 7,573,847 B2
(45) Date of Patent: Aug. 11, 2009

(54) MEDIA DISTRIBUTION SYSTEM

(75) Inventors: Christopher B. Rogers, Beaverton, OR (US); Jeffrey Schiffer, Palo Alto, CA (US); Alan E. Waltho, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 11/167,979

(22) Filed: Jun. 27, 2005

(65) Prior Publication Data

US 2006/0294573 A1    Dec. 28, 2006

(51) Int. Cl.
*H04Q 7/00* (2006.01)
(52) U.S. Cl. ...................................... 370/329
(58) Field of Classification Search ................. 455/550, 455/552.1
See application file for complete search history.

(56) References Cited

U.S. PATENT DOCUMENTS 7,286,794 B2 * 10/2007 Van Rooyen ............... 455/3.06
2003/0050070 A1 * 3/2003 Mashinsky et al. .......... 455/452
2004/0047324 A1 * 3/2004 Diener ...................... 370/338
2006/0072505 A1 * 4/2006 Carrillo et al. .............. 370/331
2006/0083205 A1 * 4/2006 Buddhikot et al. .......... 370/338
2006/0084444 A1 * 4/2006 Kossi et al. ................. 455/450
2006/0193295 A1 * 8/2006 White et al. ................ 370/336
2006/0270449 A1 * 11/2006 Kim et al. ................ 455/552.1

* cited by examiner

*Primary Examiner*—Frank Duong
(74) *Attorney, Agent, or Firm*—Kacvinsky LLC

(57) ABSTRACT

A system, apparatus, method and article to distribute media information are described. The apparatus may include a transceiver to receive digital information representing media information. The apparatus may further include a processor to couple to the transceiver, the processor to select a modulation technique based on a receiver type and an ultra-high frequency channel using a cognitive algorithm. The transceiver may transmit the media information over the channel using the modulation technique. Other embodiments are described and claimed.

20 Claims, 4 Drawing Sheets

MEDIA DISTRIBUTION SYSTEM

BACKGROUND

Communication networks are increasingly being used to distribute media information throughout a local geographical area, particularly in an office or residential environment. For example, a home may typically have a personal computer and multiple entertainment systems, such as televisions and audio equipment. The personal computer may receive media information from a central point of access into the home, and distribute the media information to the various entertainment systems. Existing techniques to distribute media information, however, may be relatively complex and have need of proprietary equipment. Consequently, improvements in media distribution systems may solve these and other problems.

BRIEF SUMMARY

In one embodiment, a transceiver receives analog or digital information representing media information. A processor, coupled to the transceiver, selects a one-way broadcast analog modulation technique based on a receiver type. The processor also selects an ultra-high frequency channel using a cognitive algorithm. The transceiver transmits the media information over that channel using the selected modulation technique. Other embodiments are described and claimed.

DETAILED DESCRIPTION

Figure 1:
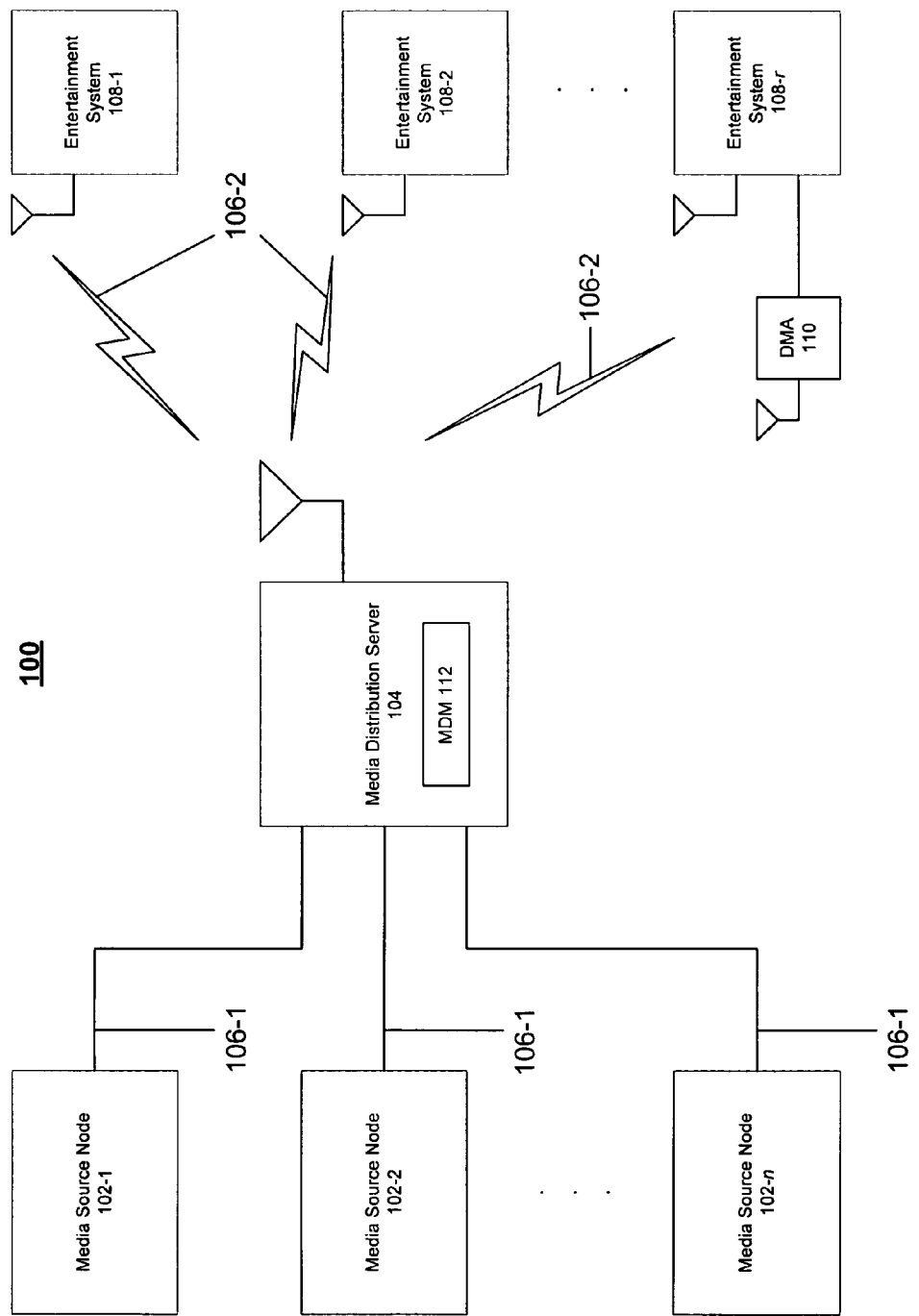
FIG. 1 illustrates one embodiment of a system.

FIG. 1 illustrates a block diagram of a system 100. In one embodiment, for example, the system 100 may comprise a communication system having multiple nodes. A node may comprise any physical or logical entity for communicating information in the system 100 and may be implemented as hardware, software, or any combination thereof, as desired for a given set of design parameters or performance constraints. Although FIG. 1 is shown with a limited number of nodes in a certain topology, it may be appreciated that system 100 may include more or less nodes in any type of topology as desired for a given implementation. The embodiments are not limited in this context.

In various embodiments, a node may comprise a media processing system, a set top box (STB), a television, a consumer appliance, a processing system, a computer system, a computer sub-system, a computer, a workstation, a terminal, a server, a personal computer (PC), a laptop, an ultra-laptop, a handheld computer, a personal digital assistant (PDA), a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

In various embodiments, the nodes of system 100 may communicate, manage, or process information in accordance with one or more protocols. A protocol may comprise a set of predefined rules or instructions for managing communication among nodes. A protocol may be defined by one or more standards as promulgated by a standards organization, such as the Internet Engineering Task Force (IETF), International Telecommunications Union (ITU), the International Organization for Standardization (ISO), the International Electrotechnical Commission (IEC), the Institute of Electrical and Electronics Engineers (IEEE), and so forth. The embodiments are not limited in this context.

In various embodiments, the nodes of system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a node to process the media information in a predetermined manner, and so forth. The embodiments are not limited in this context.

In various embodiments, system 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media, such as wired communications media 106-1. Examples of wired communications media 106-1 may include a wire, cable, printed circuit board (PCB), backplane, switch fabric, semiconductor material, twisted-pair wire, co-axial cable, fiber optics, and so forth. Wired communications media 106-1 may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media, sometimes referred to herein as wireless shared media 106-2. An example of a wireless shared media 106-2 may include portions of a wireless spectrum, such as the RF spectrum in general, and the ultra-high frequency (UHF) spectrum in particular. The wireless nodes may include components and interfaces suitable for communicating information signals over the designated wireless spectrum, such as one or more antennas, wireless transmitters/receivers ("transceivers"), amplifiers, filters, control logic, antennas, and so forth. The embodiments are not limited in this context.

In one embodiment, for example, system 100 may include one or more nodes 102-1-n. Nodes 102-1-n may comprise, for example, media source nodes 102-1-n. Media source nodes 102-1-n may comprise any media source capable of sourcing or delivering media information and/or control information to media distribution server 104. An example of a media source may include a source for video signals, such as from a computer to a display. Other examples of a media source may include a digital camera, camcorder, video surveillance system, teleconferencing system, telephone system, medical and measuring instruments, scanner system, copier system, and other sources needing media processing operations. Another example of a media source may include a source for audio signals. The audio source may be arranged to source or deliver standard audio information, such as analog or digital music. The embodiments are not limited in this context.

Another example of a media source may include a source for audio/video (AV) signals such as television signals. The media source may be arranged to source or deliver standard analog television signals, digital television signals, high definition television (HDTV) signals, and so forth. The television signals may include various types of information, such as television audio information, television video information, and television control information. The television video information may include content from a video program, computer generated images (CGI), and so forth. The television audio information may include voices, music, sound effects, and so forth. The television control information may be embedded control signals to display the television video and/or audio information, commercial breaks, refresh rates, synchronization signals, and so forth. The embodiments are not limited in this context.

In some embodiments, media source nodes 102-1-n may originate from a number of different devices or networks. For example, media source nodes 102-1-n may include a device arranged to deliver pre-recorded media stored in various formats, such as a Digital Video Disc (DVD) device, a Video Home System (VHS) device, a digital VHS device, a personal video recorder, a computer, a gaming console, a Compact Disc (CD) player, and so forth. In yet another example, media source nodes 102-1-n may include media distribution systems to provide broadcast or streaming analog or digital AV signals to media distribution server 104. Examples of media distribution systems may include, for example, Over The Air (OTA) broadcast systems, terrestrial cable systems (CATV), satellite broadcast systems, and so forth. The types and locations of media source nodes 102-1-n are not limited in this context.

In some embodiments, media source nodes 102-1-n may comprise a server accessible via a network. A server may comprise a computer or workstation, such as a web server arranged to deliver Hypertext Markup Language (HTML) or Extensible Markup Language (XML) documents via the Hypertext Transport Protocol (HTTP), for example. A network may comprise any type of data network, such as a network operating in accordance with one or more Internet protocols, such as the Transport Control Protocol (TCP) and Internet Protocol (IP). The embodiments are not limited in this context.

In one embodiment, for example, system 100 may include a node 104 coupled to one or more of media sources 102-1-n. Node 104 may comprise, for example, an apparatus to distribute media information for a wireless network. Examples of node 104 may include one or more of a computer, PC, server, laptop computer, notebook computer, workstation, media processing system, a media processing sub-system, a media processor, a media computer, a media device, a media encoder, a media decoder, a media coder/decoder (CODEC), a media compression device, a media decompression device, a media filtering device, a media transformation device, a media entertainment system, a media display, STB, or any other media processing architecture. In one embodiment, for example, node 104 may be implemented as a media distribution server. The embodiments, however, are not limited in this context.

In one embodiment, media distribution server 104 may include a sub-system 112. Sub-system 112 may comprise, for example, a media distribution management system (MDM) 112. MDM 112 may process and/or manage media distribution operations for media distribution server 104, as described in more detail below. The embodiments are not limited in this context.

In various embodiments, system 100 may include nodes 108-1-r. Node 108-1-r may comprise, for example, entertainment systems 108-1-r. Entertainment systems 108-1-r may comprise any audio and/or video systems arranged to display or reproduce media information. Examples of entertainment systems 108-1-r may include a television, television system, computer, personal computer, laptop computer, notebook computer, handheld computer, PDA, cellular telephone, cellular telephone/PDA, stereo, stereo system, and so forth. The embodiments are not limited in this context.

In one embodiment, for example, node 108-1 may comprise an analog television. The analog television may comprise the typical television components arranged to receive analog broadcast signals, such as a tuner, an analog signal decoder, a display, audio speakers, and so forth. For example, node 108-1 may include a tuner arranged to receive a one-way analog broadcasting signal that is present in a portion of a defined radio-frequency (RF) band corresponding to a given channel. In one embodiment, for example, the defined band may comprise a portion of the ultra-high frequency (UHF) spectrum. Node 108-1 may decode and reproduce/display one-way analog broadcast signals transmitted using various analog broadcast modulation techniques over wireless shared media 106-2. The analog broadcast signals may be transmitted in accordance with any number of analog broadcast standards, such as the National Television Systems Committee (NTSC) standard, Phase Alternating Line (PAL) standard, Sequential Memory Color (SECAM) standard, and so forth. The embodiments, however, are not limited in this context.

In one embodiment, for example, node 108-2 may comprise a digital television. The digital television may each comprise the typical television components arranged to receive digital broadcast signals, such as a tuner, a digital signal decoder, a display, audio speakers, and so forth. For example, node 108-2 may include a tuner arranged to receive a digital broadcasting signal that is present in a portion of a defined RF band corresponding to a given channel. In one embodiment, for example, the defined band may comprise a portion of the UHF spectrum. Node 108-2 may decode and reproduce/display digital broadcast signals transmitted using various digital broadcast modulation techniques over wireless shared media 106-2. The digital broadcast signals may be transmitted in accordance with any number of digital broadcast standards, such as the Advanced Television Systems Committee (ATSC) standard, the Digital Video Broadcasting Terrestrial (DVB-T) standard, the Integrated Services Digital Broadcasting Terrestrial (ISDB-T) standard, and so forth. The embodiments, however, are not limited in this context.

In one embodiment, for example, node 108-3 may represent either an analog entertainment system or a digital entertainment system. Furthermore, node 108-3 may also include a Digital Media Adapter (DMA) 110. DMA 110 may comprise a wireless adapter or interface device to receive and reproduce signals transmitted from a computer, such as media distribution server 104, for example. DMA 110 may operate as a wireless bridge between media distribution 104 and entertainment system 108-3. DMA 110 may use standard AV cables to connect to entertainment system 108-3. DMA 110 may also include a transceiver for communicating media information and control information between node 104 and node 108-3 over wireless shared media 106-2. The transceiver included in DMA 110 might operate over the same frequency and modulation technique as used to receive and reproduce signals from the media distribution server 104, or alternatively, may also utilize a different frequency and/or modulation technique.

In one embodiment, for example, node 108-4 may comprise a digital or analog television that integrates the functionality of the DMA 110 device to provide two-way communication support. The television may comprise the components arranged to receive both one-way digital broadcast signals and two-way communications as used to support interactive TV services, video-on-demand, or other two-way enabled capabilities. For example, node 108-4 may include a transceiver arranged to receive both one-way analog or digital broadcasting signal and two-way communications signals that are present in a portion of a defined RF band corresponding to a given channel. In one embodiment, for example, the defined band may comprise a portion of the UHF spectrum. Node 108-4 may decode and reproduce/display analog or digital broadcast signals transmitted using various broadcast modulation techniques over wireless shared media 106-2. Node 108-4 may also communicate with media distribution server 104 using one or more wireless protocols. The embodiments, however, are not limited in this context.

In one embodiment, for example, media distribution server 104 and DMA 110 may both be arranged to communicate media information and/or control information using one or more wireless protocols. Examples of wireless protocols may include various wireless local area network (WLAN) protocols, including the IEEE 802.xx series of protocols, such as IEEE 802.11a/b/g/n, IEEE 802.16, IEEE 802.20, and so forth. Other examples of wireless protocols may include various wireless wide area network (WWAN) protocols, such as Global System for Mobile Communications (GSM) cellular radiotelephone system protocols with General Packet Radio Service (GPRS), Code Division Multiple Access (CDMA) cellular radiotelephone communication systems with 1xRTT, Enhanced Data Rates for Global Evolution (EDGE) systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles (collectively referred to herein as "Bluetooth Specification"), and so forth. Other suitable protocols may include Ultra Wide Band (UWB), Digital Office (DO), Digital Home, Trusted Platform Module (TPM), ZigBee, and other protocols. Any wireless protocol may be used for a given implementation in accordance with a set of desired design constraints, as long as node 104 and DMA 110 both comprise compatible radio transceivers, video transcoding hardware, and associated software on both the source and receive side of the wireless link. It is worthy to note that some standards may be used to communicate only media information, some standards may be used to communicate only control information, and other standards may be used to communicate both media and control information. The embodiments are not limited in this context.

In general operation, media distribution server 104 may be arranged to receive analog or digital AV information from one or more media source nodes 102-1-$n$. The media distribution server 104 may receive the digital AV information from one or more media source nodes 102-1-$n$ through communication media 106-1. In one embodiment, or example, communication media 106-1 may represent wired communication media, although wireless communication media may also be used as desired for a given implementation. The media distribution server 104 may use MDM 112 to distribute the analog or digital AV information received from media source nodes 102-1-$n$ to one or more entertainment systems 108-1-$r$. The media distribution server 104 may distribute the analog or digital AV information through wireless shared media 106-2.

In various embodiments, media distribution server 104 may distribute the analog or digital AV information using one or more UHF bands and various modulation techniques to one or more entertainment systems 108-1-$r$. Based on changes in certain regulatory rules regarding certain UHF spectrum, new applications are emerging within the desirable lower portion of the UHF spectrum typically reserved for traditional UHF television broadcast communication. The use of UHF spectrum may allow low power transmission capabilities on the order of 100 milliwatts (mw) or less, for example. Media distribution server 104 may use the low power transmission capabilities offered by the UHF spectrum to broadcast analog or digital television content throughout a specific geographic location, such as a home or office. Media distribution server 104 may broadcast the analog or digital television content using the UHF band and multi-mode (e.g., analog or digital) television modulation techniques. This may be similar to the techniques used by commercial broadcasters when using high power transmission and large regional coverage antennas.

Within a local geographical environment, such as a home or office, the use of UHF spectrum may provide several advantages. For example, the UHF spectrum is particularly well-suited for wall penetration and therefore may offer robust high quality AV distribution to multiple rooms due to the short multipath delay spread that is created within a room. In another example, the use of UHF bands and multi-mode modulation hardware may allow media distribution server 104 to communicate the AV signals to one-way communication legacy entertainment systems, such as entertainments systems 108-1, 108-2, without the need of additional hardware or software components, such as DMA 110.

In the case of analog entertainment systems such as entertainment system 108-1, media distribution server 104 may be arranged to down convert a digital AV stream to analog information, and transmit the analog information using analog broadcast modulation techniques, such as NTSC, PAL and SECAM, for example. Alternatively, media distribution server 104 may attempt to communicate the digital AV stream using analog broadcast modulation techniques if sufficient bandwidth is available. In this manner, media distribution server 104 may provide AV service to entertainment system 108-1 having an analog UHF tuner without requiring any new hardware on the receive side.

In the case of digital entertainment systems such as entertainment system 108-2, media distribution server 104 may be arranged to transmit a digital AV stream using digital broadcast modulation techniques, such as ATSC, DVB-T and ISDB-T, for example. In this manner, media distribution server 104 may provide AV service to entertainment system 108-2 having an integrated digital television tuner without requiring any new hardware on the receive side.

In some cases, an entertainment system may use a DMA, such as entertainment system 108-3 coupled to DMA 110. In this case, media distribution server 104 may be arranged to transmit a digital AV stream using digital broadcast modulation techniques, such as ATSC, DVB-T and ISDB-T, for example. Media distribution server 104 may also be arranged to transmit the digital AV stream using WLAN communication techniques as well. Furthermore, the presence of DMA 110 may allow authentication operations to ensure that entertainment system 108-3 is authorized to receive the digital AV stream.

In various embodiments, media distribution server 104 may provide the capability to support legacy television tuner devices in existing broadcast bands. Media distribution server 104 may use specific radio hardware that employs cognitive radio techniques and adaptive modulation techniques that allow for real-time dynamic multi-mode support for entertainment systems 108-1-r. Media distribution server 104 may use a UHF transceiver arranged to operate on a cognitive basis to identify television channels that are unused or vacant, that is, not currently being used for television broadcasting or by neighboring UHF transceiver peers within transmission range of the UHF transceiver. The UHF transceiver may then operate on one of these vacant channels using a modulation format similar or identical to current analog and/or digital broadcast modulation techniques.

In various embodiments, media distribution server 104 may use one or more cognitive radio techniques or algorithms. For example, the cognitive radio techniques or algorithms may be used to facilitate selection of vacant television channels. In another example, the cognitive radio techniques may assist in controlling the transmitter power used on these vacant channels so that it does not cause interference to television receivers that are operating on the channels adjacent to the vacant channels. In yet another example, the radio cognitive techniques may be used to ensure that there is a low probability of failing to detect an occupied channel. The embodiments are not limited in this context.

In various embodiments, media distribution server 104 may distribute the AV information using one or more UHF bands and various modulation techniques based upon the receiver type of nodes 108-1-r. For example, media distribution server 104 may distribute the AV information over a UHF band using analog broadcast modulation techniques for analog television 108-1. In another example, media distribution server 104 may distribute the AV information over a UHF band using digital broadcast modulation techniques for digital television 108-2. In yet another example, media distribution server 104 may distribute the digital AV information using WLAN techniques for digital television 108-3 having DMA 110. System 100 in general, and media distribution server 104 in particular, may be described in more detail with reference to FIGS. 2-4.

Figure 2:
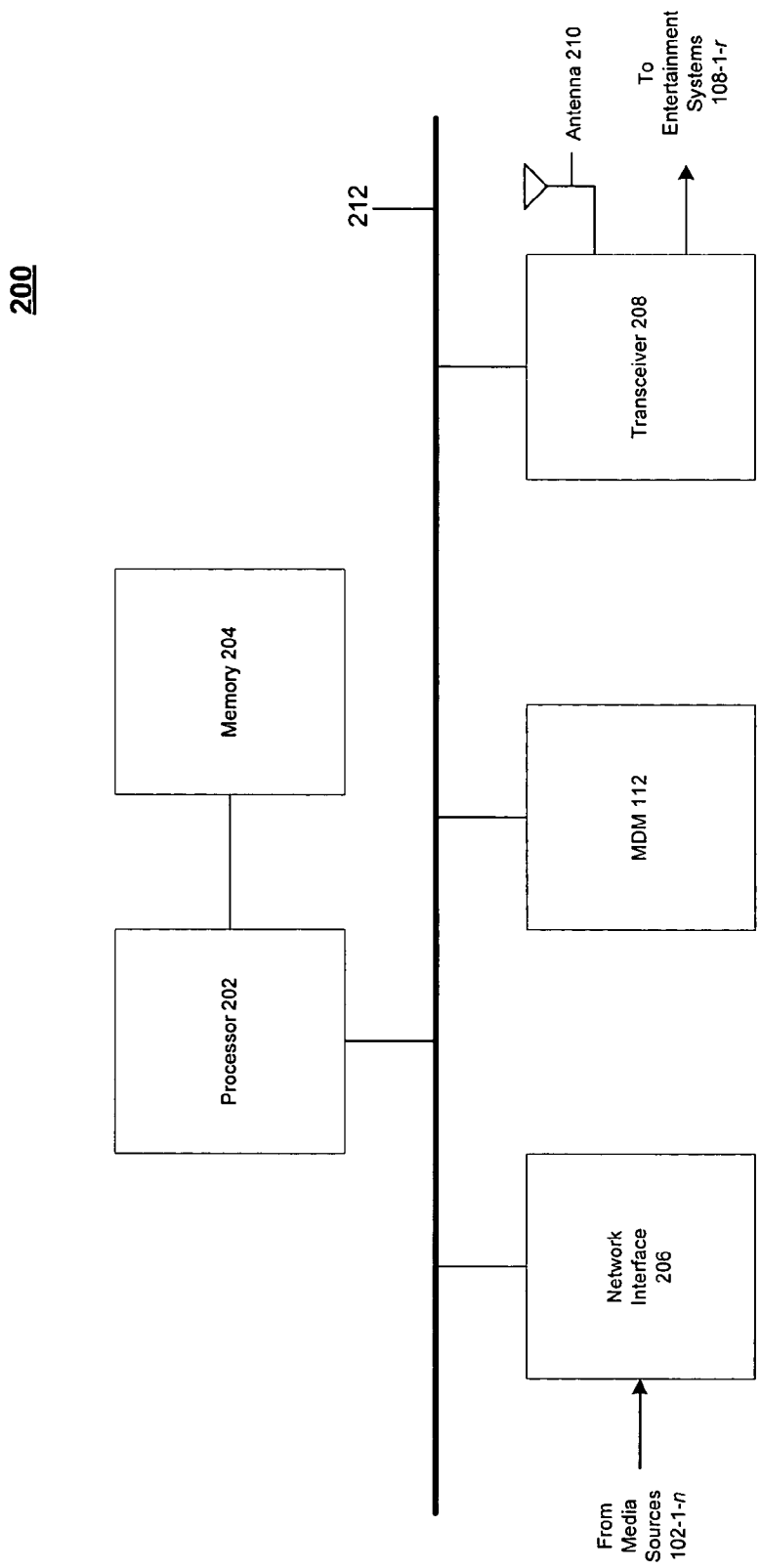
FIG. 2 illustrates one embodiment of a node.

FIG. 2 illustrates a block diagram of a node in accordance with one embodiment of the system. FIG. 2 illustrates a block diagram of a node 200. Node 200 may be representative of a node suitable for use with system 100 as described with reference to FIG. 1, such as media distribution server 104, for example. The embodiments are not limited, however, to the example given in FIG. 2.

As shown in FIG. 2, node 200 may comprise multiple elements, such as elements 202, 204, 206, 208, and 210, all connected via bus 212. These elements, or any sub-elements, may be implemented using one or more circuits, components, registers, processors, software subroutines, modules, or any combination thereof, as desired for a given set of design or performance constraints. Although FIG. 2 shows a limited number of elements by way of example, it can be appreciated that more or less elements may be used in node 200 as desired for a given implementation. The embodiments are not limited in this context.

In one embodiment, node 200 may include an element 202. In one embodiment, for example, element 202 may comprise a processor. Processor 202 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation, Santa Clara, Calif. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, and so forth. In one embodiment, for example, processor 202 may be implemented as a MAC processor coupled to transceiver 208. The embodiments, however, are not limited in this context.

In one embodiment, node 200 may include an element 204. In one embodiment, for example, element 204 may comprise memory. Memory 204 may include any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 204 may be included on the same integrated circuit as processor 202, or alternatively some portion or all of memory 204 may be disposed on an integrated circuit or other medium, for example a hard disk drive, that is external to the integrated circuit of processor 202. The embodiments are not limited in this context.

In one embodiment, node 200 may include network interface 206. Network interface 206 may comprise any wired or wireless network interface that may be arranged to operate with any suitable technique for controlling information signals between one or more media source nodes 102-1-n and media distribution server 104 using a desired set of communications protocols, standards, services or operating procedures. For example, network interface 206 may be arranged to operate in accordance with one or more Ethernet protocols such as Fast Ethernet or Gigabit Ethernet, one or more Internet protocols such as TCP/IP, one or more wireless protocols such as IEEE 802.11, 802.16 and 802.20, CATV protocols, satellite system protocols, analog broadcast protocols, digital broadcast protocols, and so forth. Network interface 206 may also include the appropriate physical connectors to connect with a corresponding communications media 106-1 for media source nodes 102-1-n. The embodiments are not limited in this context.

In one embodiment, node 200 may include a transceiver 208. Transceiver 208 may comprise a wireless transmitter and/or a receiver having the components and interfaces suitable for communicating information signals over the wireless shared media 106-2 at a given operating frequency. For example, transceiver 208 may be arranged to communicate media information and control information using an operating frequency in the UHF band as defined by a given governmental regulatory agency for a country, such as the Federal Communications Commission (FCC) for the United States. The UHF band as defined by the FCC may comprise those radio-frequencies ranging from approximately 300 Megahertz (MHz) to approximately 3000 MHz. The UHF television band is approximately channels 14 to 69, which may range from approximately 470 MHz to approximately 800 MHz. The embodiments, however, are not necessarily limited to this frequency range.

In one embodiment, transceiver 208 may be coupled to one or more antennas 210. Examples of antenna 210 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. In one embodiment, for example, node 200 may comprise a single antenna 210. In another embodiment, for example, node 200 may comprise multiple antennas 210. The use of multiple antennas may be used to provide a spatial division multiple access (SDMA) system or a multiple-input multiple-output (MIMO) system, for example. The embodiments are not limited in this context.

In one embodiment, transceiver 208 may also be arranged to communicate media information and control information using an operating frequency appropriate for WLAN systems. Current WLAN systems operating in accordance with a number of OFDM techniques may support a wide range of data rates of up to 54 Mbps or more in the 2.4 Gigahertz (GHz) region. Other potentially higher data rates and transmit modes may be available as well. Examples of such WLAN systems may include IEEE 802.11 a/b/g/n , 802.16 and 802.20 systems. The embodiments, however, are not limited in this context.

In some embodiments, the transceiver operations may be separated among multiple transceivers. For example, transceiver 208 may comprise multiple separate transceivers, with a first transceiver arranged to use an operating frequency in the UHF band, a second transceiver arranged to use an operating frequency suitable for WLAN systems, and so forth. The embodiments are not limited in this context.

In one embodiment, node 200 may include MDM 112. As previously described, MDM 112 may comprise, for example, a sub-system to media distribution server 104 to process and/or manage distribution of media information to other nodes of system 100, such as entertainment systems 108-1-r. In one embodiment, for example, MDM 112 may select a modulation technique based on a receiver type for entertainment systems 108-1-r. MDM 112 may also select an available (e.g., vacant or unused) UHF channel using one or more cognitive radio techniques, such as a cognitive algorithm, for example. Transceiver 208 may transmit the media information over the selected channel using the selected modulation technique to one or more entertainment systems 108-1-r.

It is worthy to note that when implemented in software for execution by processor 202, MDM 112 may comprise program instructions stored in memory 204, rather than implemented as a separate element as shown in FIG. 2. MDM 112 may be described in further detail with reference to FIG. 3.

Figure 3:
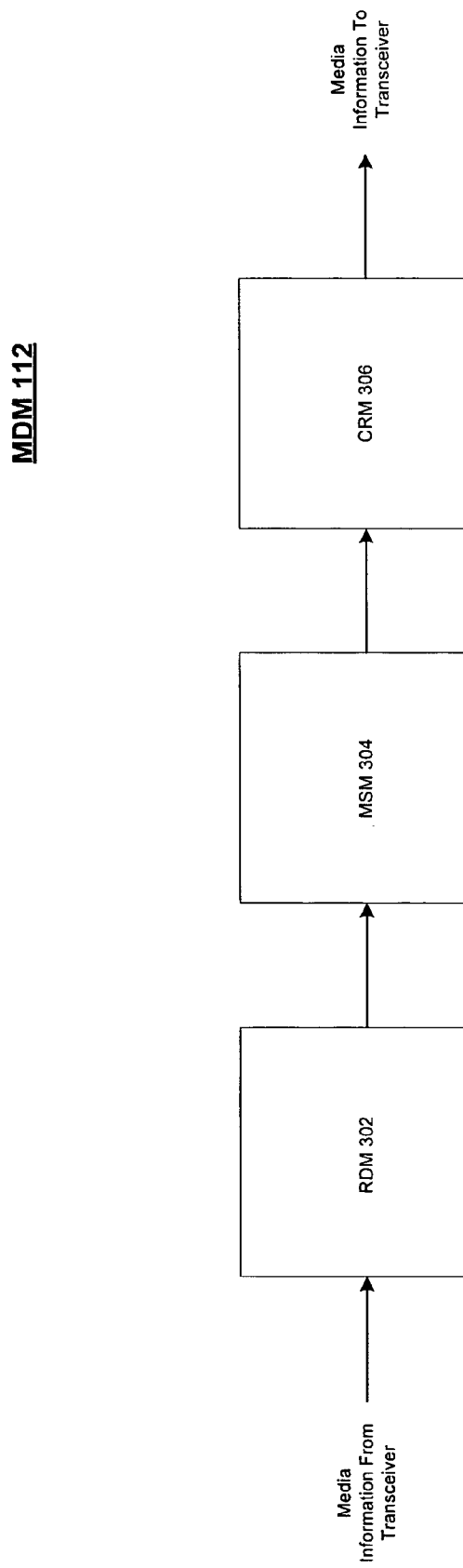
FIG. 3 illustrates one embodiment for a media distribution manager.

FIG. 3 illustrates a block diagram of sub-system in accordance with one embodiment. FIG. 3 may illustrate a more detailed block diagram of MDM 112. As shown in FIG. 3, MDM 112 may comprise multiple elements, such as elements 302, 304 and 306. These elements may be implemented using one or more circuits, components, registers, processors, software subroutines, modules, or any combination thereof, as desired for a given set of design or performance constraints. Although FIG. 3 shows a limited number of elements by way of example, it can be appreciated that more or less elements may be used in MDM 112 as desired for a given implementation. The embodiments are not limited in this context.

In one embodiment, MDM 112 may include an element 302. In one embodiment, for example, element 302 may comprise a receiver detection module (RDM). RDM 302 may be arranged to determine a receiver type to receive media information from media distribution server 104. Examples of receiver types may include analog receive only devices and digital receive only devices. For example, entertainment system 108-1 may have a receiver type of an analog receive only device, entertainment system 108-2 may have a receiver type of a digital receive only device, and 108-3, 108-4 may have a receiver type of either an analog receive only device or digital receive only device. It may be appreciated that some entertainment systems may have multiple operating modes (e.g., analog and digital), and therefore may have multiple receiver types assigned to them. RDM 302 may select a modulation technique to encode the media information based on the detected receiver type. The embodiments are not limited in this context.

In various embodiments, RDM 302 may determine a receiver type using a number of different techniques. For example, RDM 302 may access a configuration file having configuration information indicating a given receiver type. A user may access a user interface for media distribution server 104 to program or configure a receiver type corresponding to entertainment systems 108-1-r within a local geographical area (e.g., home or office). The user may also select which entertainment systems 108-1-r should be receiving the media information from media distribution server 104. Default receiver types may also be provided for the configuration file as well. The embodiments are not limited in this context.

In various embodiments, RDM 302 may automatically perform detection operations to determine a given receiver type. For example, entertainment system 108-3 may be coupled to a DMA 110. RDM 302 may send a control signal such as a discovery message via transceiver 208 to any devices within transmission range of transceiver 208. Devices such as DMA 110 capable of detecting the discovery message may respond with a response message. The response message may include configuration and capabilities information for DMA 110 and/or entertainment system 108-3. RDM 302 may use the configuration and capabilities information to automatically determine a receiver type for entertainment system 108-3. RDM 302 may retrieve the receiver type from a defined field holding an explicit value representing the receiver type, or may determine a receiver type based on a rule set implicitly evaluating the configuration and capabilities information. Once the receiver type is determined, RDM 302 may output a receiver type value. The embodiments are not limited in this context.

In various embodiments, RDM 302 may also be arranged to convert the digital AV information to analog information when appropriate using a suitable digital-to-analog converter (DAC). This may be desirable if the transmission of digital AV information is not appropriate, such as when there are high amounts of interference, bandwidth constraints, hardware constraints, and so forth. The embodiments are not limited in this context.

In one embodiment, MDM 112 may include an element 304. In one embodiment, for example, element 304 may comprise a modulation selection module (MSM). MSM 304 may be coupled to RDM 302. MSM 304 may receive the receiver type value and use the receiver type value to select a modulation technique to broadcast the media information over wireless shared media 106-2. For example, if the receiver type value indicates an analog receive only type, MSM 304 may select a one-way broadcast analog modulation technique to transmit the media information to entertainment system 108-1. In another example, if the receiver type value indicates a digital receiver, MSM 304 may select a one-way or two-way broadcast digital modulation technique to transmit the media information to entertainment systems 108-2 and/or 108-3, 108-4. The embodiments are not limited in this context.

In one embodiment, MDM 112 may include an element 306. In one embodiment, for example, element 306 may comprise a cognitive radio manager module (CRM). CRM 306 may be arranged to select a channel from the operating frequencies assigned to transceiver 208 to communicate the media information over wireless shared media 106-2. In one embodiment, for example, CRM 306 may use a cognitive algorithm to intelligently select the communication channel. For example, CRM 306 may perform spectrum sensing or pre-scan techniques of wireless shared media 106-2 to locate vacant or unused channels over wireless shared media 106-2. This may be accomplished by measuring one or more characteristics of wireless shared media 106-2, such as a received signal strength indicator (RSSI), for example. CRM 306 may intelligently select a communication channel from the list of unused channels in accordance with a number of selection rules. For example, CRM 306 may select a communication channel from the list of potential unused channels based on the measured characteristic (e.g., RSSI) for each unused channel (e.g., highest RSSI). In another example, CRM 306 may evaluate power levels of adjacent channels, and select the communication channel based on the load of adjacent channels. In addition to pre-scans, CRM 306 may perform background scans on a continuous or periodic basis, and compare the unused channels to the currently used channel to determine whether media distribution server should potentially switch broadcasting media information from the existing channel to a new channel offering superior quality. In this case, a message may be visually displayed or audibly reproduced for a user to determine whether the user would like to switch channels to improve reception quality. The embodiments are not limited in this context.

In general operation, transceiver 208 of media distribution system 200 may receive digital information representing media information. The digital information may comprise media information encoded using a given digital format, such as a Motion Pictures Expert Group (MPEG) 1-4 encoding format. Transceiver 208 may indicate to MDM 112 the receipt of the digital information to initiate media distribution operations, such as selection of receiver type, modulation technique and communication channel. RDM 302 may determine a receiver type for one or more entertainment system 108-1-r, and output a receiver type value. MSM 304 may receive the receiver type value, select a modulation technique based on the receiver type value, and output a modulation technique value. CRM 306 may receive the modulation technique value, select a UHF channel using a cognitive algorithm, and output a channel value. Transceiver 208 may receive the modulation technique value and channel value, and begin to transmit media information from one or more media source nodes 102-1-n over the selected channel using the selected modulation technique. The embodiments are not limited in this context.

In various embodiments, MDM 112 may detect a DMA for an entertainment system 108-1-r, such as DMA 110 coupled to entertainment system 108-3, for example. In this case, MDM 112 may perform additional media distribution operations such as attempting to establish an optimized connection with DMA 110 using various discovery and negotiating techniques. For example, transceiver 208 may transmit control information to DMA 110, and wait for a response from DMA 110. The presence of absence of DMA 110 may be determined based on a response for DMA 110, or the expiration of a timeout value prior to receiving a response for DMA 110. MDM 112 may use the latter technique to determine that there are no active DMAs within the transmission range of transceiver 208, thereby obviating those operations associated with setting up a WLAN connection. If DMA 110 is detected, however, MDM 112 may use the cognitive radio techniques provided by CRM 306 to intelligently select an appropriate UHF channel based on the current operating loads of wireless shared media 106-2. Transceiver 208 may then begin transmitting media information over the connection over wireless shared media 106-2. The embodiments are not limited in this context.

In various embodiments, the presence of DMA 110 may allow MDM 112 to implement one or more content protection techniques. Some of the media information distributed by media distribution server 104 may be subject to certain legal protections to prevent unauthorized copying or viewing. MDM 112 may be arranged to perform authentication operations to ensure that the device receiving the media information is a legitimate and authorized recipient of the content protected material. Prior to media distribution server 104 distributing media information to an entertainment system such as entertainment system 108-3, MDM 112 and DMA 110 may engage in a series of authentication and authorization operations to ensure that a device is actually entertainment system 108-3, and that entertainment system 108-3 is authorized to receive the media information. Furthermore, MDM 112 and DMA 110 may be used to encrypt the media information if desired. In this manner, MDM 112 and DMA 110 may be used to implement any number of different content protection techniques to ensure that media distribution server 104 only delivers authorized media information to an authenticated entertainment system 108-3. The embodiments are not limited in this context.

In various embodiments, MDM 112 may perform some or all of the media distribution operations at different time intervals. For example, certain media distribution operations may be performed once during setup of a media distribution server 104. This may be desirable when providing initial power to one or more nodes of system 100 (e.g., a node is turned on). In another example, certain media distribution operations may be performed in response to changes in operational modes of nodes 102-1-n, 104, and 108-1-r. This may occur if power is removed from a node (e.g., a node is turned off). In yet another example, certain media distribution operations may be performed in response to changes in one or more communications characteristics of wireless shared media 106-2. In yet another example, certain media distribution operations may be performed automatically on a periodic basis. This may occur if media distribution server 104 decides to automatically switch operating channels for distributing the media information. In still another example, certain media operations may be performed in response to an external command, such as commands received from nodes 102-1-n, 104 and 108-1-r, an external device such as a remote control, from a software user interface, from a hardware user interface (e.g., channel selector), and so forth. The embodiments are not limited in this context.

In various embodiments, media distribution server 104 may be arranged to communicate analog or digital AV information in a number of different modes. For example, media distribution server 104 may communicate the AV information to one entertainment system 108-1-r at a time in sequence. In another example, media distribution server 104 may communicate the AV information to multiple entertainment systems 108-1-r simultaneously or in parallel using various modulation techniques. In yet another example, media distribution server 104 may communicate the AV information to multiple entertainment systems 108-1-r using various multiplexing techniques, such as frequency-division multiplexing, time-division multiplexing, space-division multiplexing, code-division multiplexing, orthogonal-frequency multiplexing, and so forth. The latter techniques may be desirable when a home or office has multiple entertainment systems having varying hardware and software capabilities. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
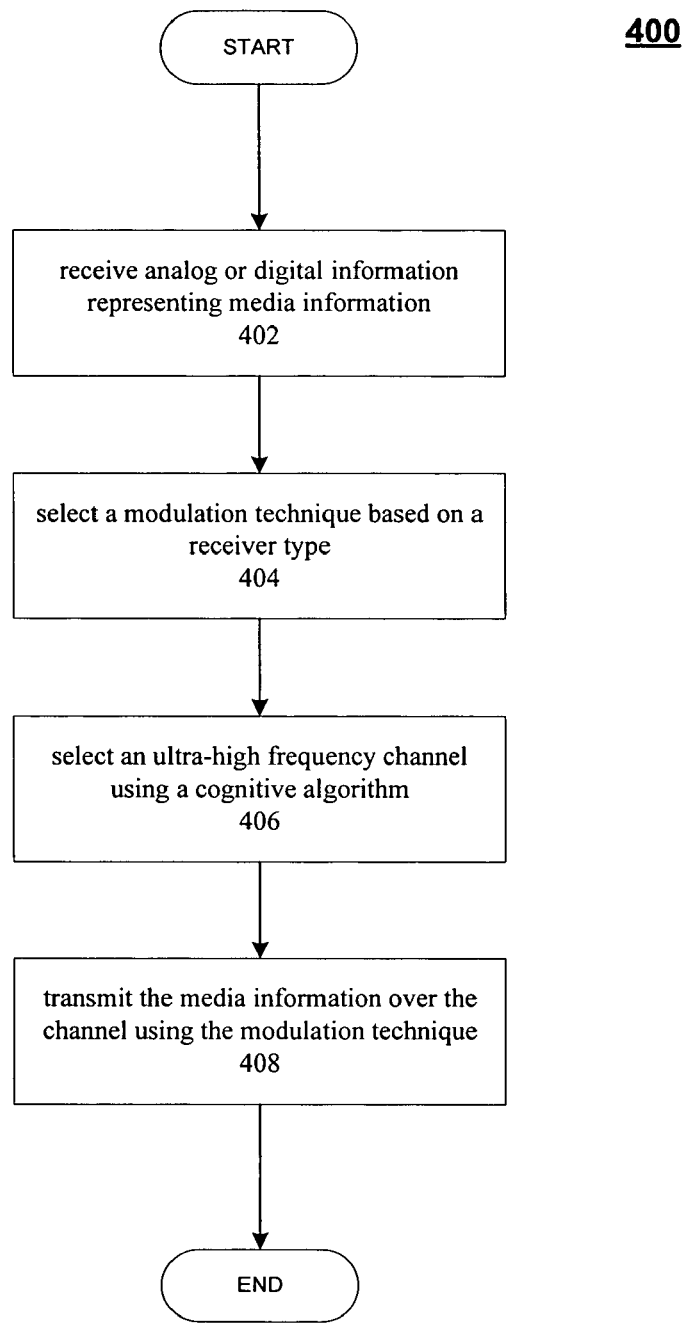
FIG. 4 illustrates a logic diagram in accordance with one embodiment.

FIG. 4 illustrates a logic diagram in accordance with one embodiment. FIG. 4 illustrates a logic flow 400. Logic flow 400 may be representative of the operations executed by one or more structure described herein, such as system 100, node 200, and/or element 120. As shown in logic flow 400, analog or digital information representing media information may be received at block 402. A modulation technique may be selected based on a receiver type at block 404. A UHF channel may be selected using a cognitive algorithm at block 406. The media information may be transmitted over the channel using the modulation technique at block 408. The embodiments are not limited in this context.

In one embodiment, the modulation technique may be determined based on a receiver type. In one embodiment, for example, the receiver type may comprise an analog receive only device. In this case, the media information may be transmitted over the channel using a one-way broadcast analog modulation technique. In one embodiment, for example, the receiver type may comprise a digital receive only device. In this case, the media information may be transmitted over the channel using a one-way broadcast digital modulation technique. The embodiments are not limited in this context.

In one embodiment, a DMA may be detected. In this case, a two-way connection may be established with the DMA. In one embodiment, for example, control information may be transmitted to a receiver, such as a DMA. A response to the control information may be received from the receiver. The DMA may be detected based on the response, or alternatively, when a timeout period expires without receiving any response. The media information may then be transmitted over the two-way connection. The embodiments are not limited in this context.

The operation of the above described embodiments may be further described by way of example. Based on the current IEEE 802.11 series of standards, the minimum hardware requirements for wireless AV distribution in the home calls for compatible radio transceivers, video transcoding hardware, and associated software on both the source and receive side of the wireless link. In the case where the receiving device is a legacy television set, an additional DMA device is typically needed in order to enable the legacy television set to receive and interpret the AV source content for display. With the availability of UHF spectrum enabling the use of cognitive radios in traditional television broadcast spectrum, media distribution server 104 may be arranged to deliver improved signal quality with two-way communication links for devices with mutually compatible radios at each end of the wireless link. Furthermore, media distribution server 104 may also be arranged to deliver AV source content to legacy devices over one-way communication links, with the legacy devices being designed only to render signals using UHF bands and traditional analog and digital broadcast modulation. The combination of supporting cognitive radio for low power UHF broadcast and multi-mode modulation allows media distribution server 104 to provide flexible AV distribution capability in a home or office that allows users to support their existing AV equipment as well any optimized AV equipment (e.g., with a DMA).

In one example, assume media source 102-1 comprises a CATV system providing analog or digital AV source content. For example, media source 102-1 may provide digital AV source content in the form of an MPEG-2 digital stream of information received over co-axial cable. Media source 102-1 may provide the MPEG-2 digital stream to media distribution server 104. Assume for purposes of this example that media distribution server 104 is a PC enhanced with a UHF transceiver and an 802.11 WLAN transceiver.

In one example, transceiver 208 may indicate to MDM 112 of media distribution server 104 the receipt of the incoming MPEG-2 digital stream. MDM 112 may initiate media distribution operations, such as selection of receiver type, modulation technique and communication channel, using the one-way communication link. MDM 112 may initiate such operations by using UHF transceiver 208 to perform over-the-air control signaling with the entertainment systems within transmission range of UHF transceiver 208.

When a one-way communication link is available between media distribution server 104 and an entertainment system, and the entertainment system is an analog entertainment system such as entertainment system 108-1, RDM 302 may determine a receiver type for entertainment system 108-1, and output a receiver type value indicating an analog receive only device, such as an analog NTSC receiver. RDM 302 may determine the receiver type by retrieving a receiver type value from a configuration file, or by failing to receive a response from entertainment system 108-1 to the over-the-air control signaling within a certain predetermined period of time. MSM 304 may receive the receiver type value indicating an analog receive only device, and select an analog modulation technique based on the analog receiver type value, and output an analog modulation technique value appropriate for a NTSC analog television. CRM 306 may receive the analog modulation technique value, select a UHF channel using a cognitive algorithm, and output a channel value. Since entertainment system 108-1 is an analog television, CRM 306 may use the cognitive algorithm and detection techniques suitable for one-way transmission channels. Transceiver 208 may receive the analog modulation technique value and selected channel value, and begin to transmit the media information from media source node 102-1 in the form of an MPEG-2 digital stream over the selected channel using the one-way broadcast analog modulation technique. The embodiments are not limited in this context.

When a one-way communication link is available between media distribution server 104 and an entertainment system, and the entertainment system is a digital entertainment system such as entertainment system 108-2, RDM 302 may determine a receiver type for entertainment system 108-2, and output a receiver type value indicating a digital receiver, such as a digital ATSC receiver. RDM 302 may determine the receiver type by retrieving a receiver type value from a configuration file, or by failing to receive a response to the over-the-air control signaling from entertainment system 108-2 within a certain predetermined period of time. MSM 304 may receive the receiver type value indicating a digital receive only device, and select a digital modulation technique based on the digital receiver type value, and output a digital modulation technique value appropriate for an ATSC digital television. CRM 306 may receive the digital modulation technique value, select a UHF channel using a cognitive algorithm, and output a channel value. Since entertainment system 108-1 is a digital television, CRM 306 may use the cognitive algorithm and detection techniques suitable for one-way transmission channels. Transceiver 208 may receive the digital modulation technique value and selected channel value, and begin to transmit the media information from media source node 102-1 in the form of an MPEG-2 digital stream over the selected channel using a one-way broadcast digital modulation technique. The embodiments are not limited in this context.

On the receive side, the analog tuner of entertainment system 108-1 or the digital tuner of entertainment system 108-2 may be set to the appropriate channel selected by media distribution server 104. This may be accomplished manually by the user in response to information provided by media distribution server 104. For example, the selected channel information may be displayed by media distribution server 104 via an attached display for visual indication to the user, or reproduced by media distribution server 104 via an attached speaker for audible indication to the user. This may also be accomplished automatically in response to control information communicated from media distribution server 104 using RF or infrared (IR) command codes. In the latter case, media distribution server 104 may include an IR transmitter to send the IR command codes. The embodiments are not limited in this context.

When a two-way communication link is available between media distribution server 104 and an entertainment system, such as entertainment system 108-3 coupled to DMA 110, RDM 302 may determine a receiver type for entertainment system 108-2, and output a receiver type value indicating a digital receive only device or an analog receive only device. RDM 302 may determine the receiver type by retrieving a receiver type value from a configuration file, or by receiving a response to the over-the-air control signaling from DMA 110 of entertainment system 108-3 within a certain predetermined period of time. MSM 304 may receive the receiver type value, and select a corresponding modulation technique based on the receiver type value, and output a modulation technique value appropriate for entertainment system 108-3. CRM 306 may receive the modulation technique value, select a UHF channel using a cognitive algorithm, and output a channel value.

Since entertainment system 108-1 uses a two-way communication link between media distribution server 104 and DMA 110, CRM 306 may use the cognitive algorithm and detection techniques suitable for two-way transmission channels, such as attempting to establish an optimized connection with DMA 110 using various discovery and negotiating techniques. For example, transceiver 208 may transmit control information to DMA 110, and wait for a response from DMA 110. The presence of DMA 110 may be determined based on a response for DMA 110 prior to a timeout value expiring. If DMA 110 is detected, MDM 112 may use the cognitive radio techniques provided by CRM 306 to intelligently select an appropriate UHF channel based on the current operating loads of wireless shared media 106-2. For example, CRM 306 may use transceiver 208 to perform pre-scanning operations, background scanning operations, radio parameterization, measurement operations of one or more characteristics of wireless shared media 106-2, and so forth. CRM 306 may also use information provided by DMA 110, such as configuration information, capabilities information, measurement information, preambles, and so forth. Transceiver 208 may then begin to transmit the media information from media source node 102-1 in the form of an MPEG-2 digital stream over the selected UHF channel using the appropriate broadcast analog or digital modulation technique, if possible. Otherwise, transceiver 208 may begin to transmit the MPEG-2 digital stream over a WLAN channel using OFDM, CDMA, DSSS, or other suitable WLAN modulation techniques. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
 a transceiver to receive analog or digital information representing media information;
 a receiver detection module to determine a receiver type to receive the media information;
 a modulation selection module to select a one-way broadcast analog modulation technique based on a detected analog receiver type or a one-way or two-way broadcast digital modulation technique based on a detected digital receiver type; and
 a cognitive radio manager module to select an ultra-high frequency channel using a cognitive algorithm, said transceiver to transmit said media information over said channel using said selected analog or digital modulation technique.

2. The apparatus of claim 1, said channel comprising an unused or vacant channel.

3. The apparatus of claim 2, wherein the processor selects the unused or vacant channel dynamically based on selection rules.

4. The apparatus of claim 2, wherein the processor selects the unused or vacant channel dynamically based on measured characteristics for each unused or vacant channel.

5. The apparatus of claim 2, wherein the processor compares parameters of the selected vacant or unused channel with parameters of a plurality of remaining unused channels to determine if a new unused or vacant channel should be selected.

6. A system, comprising:
 an antenna;
 a transceiver to couple to said antenna, said transceiver to receive analog or digital information representing media information;
 a receiver detection module to determine a receiver type to receive the media information;
 a modulation selection module to select a one-way broadcast analog modulation technique based on a detected analog receiver type or a one-way or two-way broadcast digital modulation technique based on a detected digital receiver type; and
 a cognitive radio manager module to select an ultra-high frequency channel using a cognitive algorithm, said transceiver to transmit said media information over said channel using said selected analog or digital modulation technique.

7. The system of claim 6, said channel comprising an unused or vacant channel.

8. The system of claim 7, wherein the processor selects the unused or vacant channel dynamically based on selection rules.

9. The system of claim 7, wherein the processor selects the unused or vacant channel dynamically based on measured characteristics for each unused or vacant channel.

10. The system of claim 7, wherein the processor compares parameters of the selected vacant or unused channel with parameters of a plurality of remaining unused channels to determine if a new unused or vacant channel should be selected.

11. A method, comprising:
 receiving analog or digital information representing media information;
 selecting a one-way broadcast analog modulation technique based on a detected analog receiver type or a one-way or two-way broadcast digital modulation technique based on a detected digital receiver type;
 selecting an ultra-high frequency channel using a cognitive algorithm; and
 transmitting said media information over said channel using said selected analog or digital modulation technique.

12. The method of claim 11, said channel comprising an unused or vacant channel.

13. The method of claim 12, wherein the processor selects the unused or vacant channel dynamically based on selection rules.

14. The method of claim 12, further comprising:
selecting the unused or vacant channel dynamically based on measured characteristics for each unused or vacant channel.

15. The method of claim 12, further comprising:
comparing parameters of the selected vacant or unused channel with parameters of a plurality of remaining unused channels to determine if a new unused or vacant channel should be selected.

16. An article comprising a machine-readable storage medium containing instructions that if executed enable a system to receive analog or digital information representing media information, select a one-way broadcast analog modulation technique based on a detected analog receiver type or a one-way or two-way broadcast digital modulation technique based on a detected digital receiver type, select an ultra-high frequency channel using a cognitive algorithm, and transmit said media information over said channel using said selected analog or digital modulation technique.

17. The article of claim 16, said channel comprising an unused or vacant channel.

18. The article of claim 17, further comprising instructions that if executed enable the system to select the unused or vacant channel dynamically based on selection rules.

19. The article of claim 17 further comprising instructions that if executed enable the system to select the unused or vacant channel dynamically based on measured characteristics for each unused or vacant channel.

20. The article of claim 17, further comprising instructions that if executed enable the system to compare parameters of the selected vacant or unused channel with parameters of a plurality of remaining unused channels to determine if a new unused or vacant channel should be selected.

* * * * *

UNITED STATES PATENT AND TRADEMARK OFFICE
CERTIFICATE OF CORRECTION

PATENT NO. : 7,573,847 B2  Page 1 of 1
APPLICATION NO. : 11/167979
DATED : August 11, 2009
INVENTOR(S) : Rogers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Seventh Day of September, 2010

David J. Kappos
*Director of the United States Patent and Trademark Office*